Patented Sept. 12, 1922.

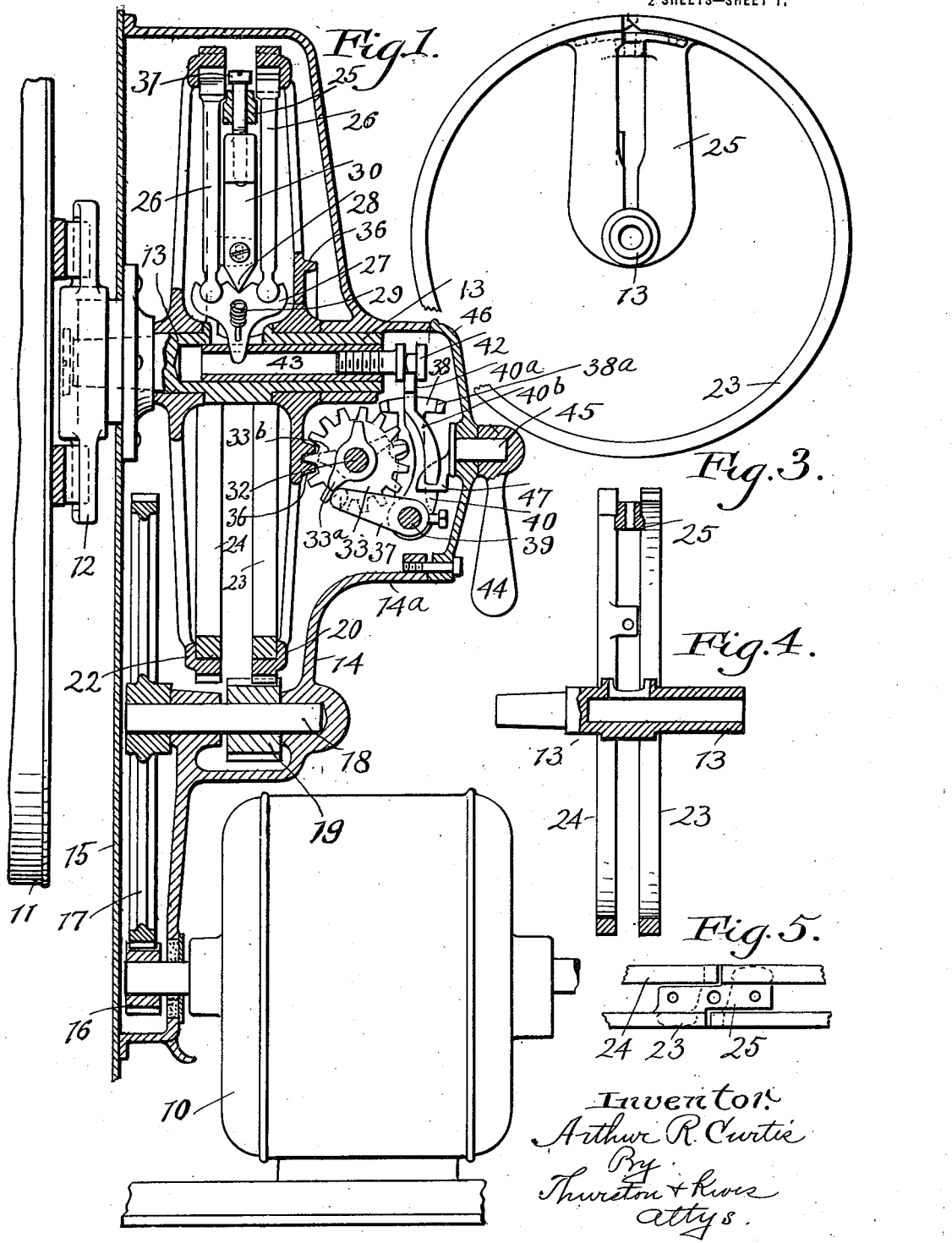

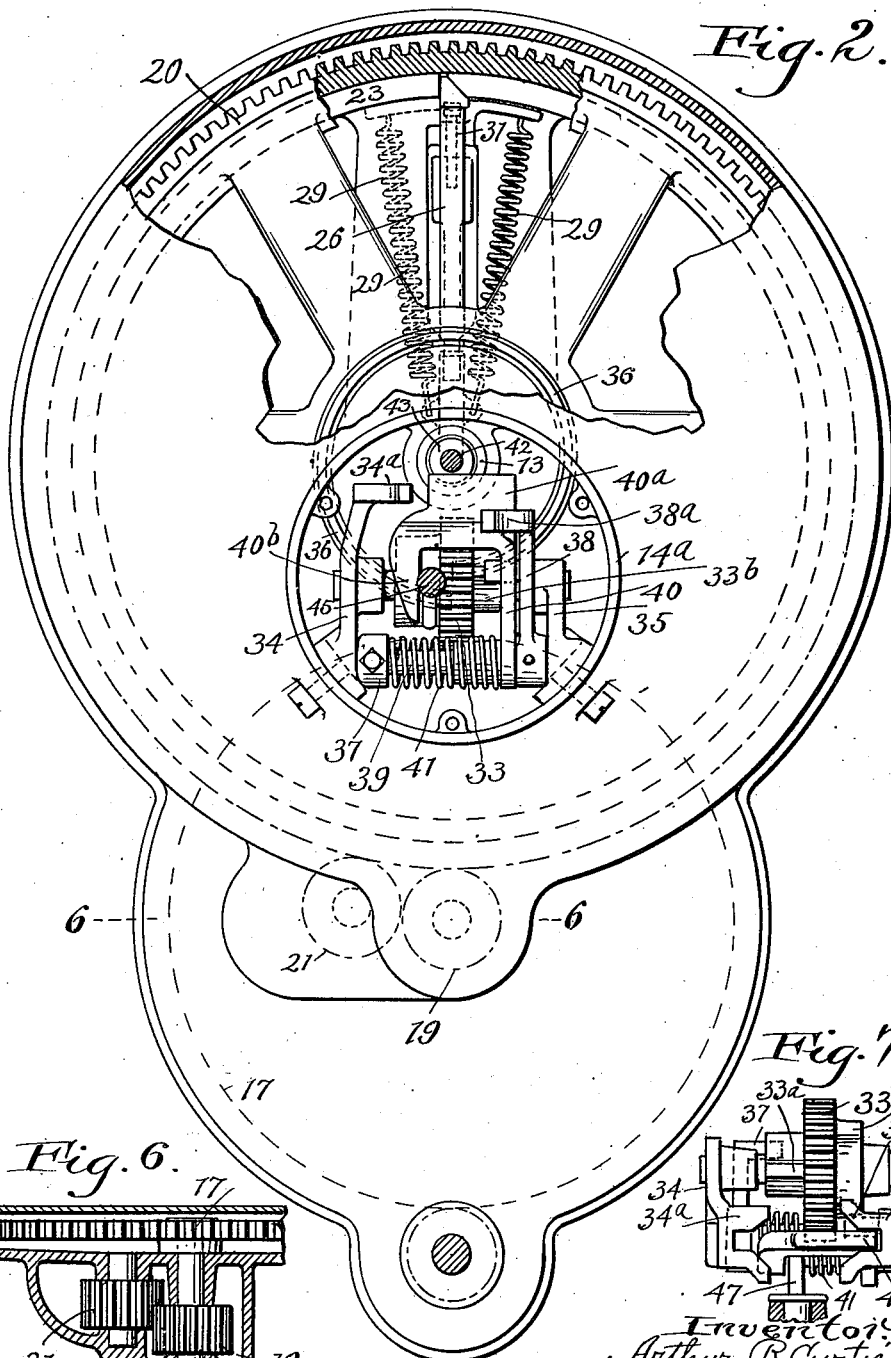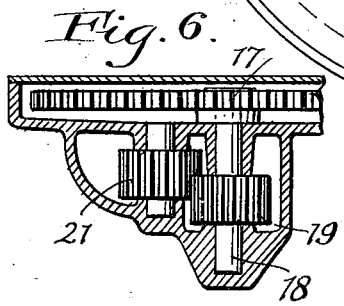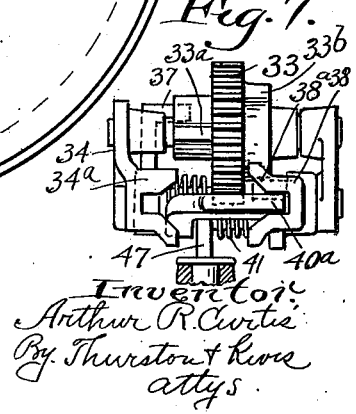

1,429,064

UNITED STATES PATENT OFFICE.

ARTHUR R. CURTIS, OF CLEVELAND, OHIO.

WASHER-DRIVE MECHANISM.

Application filed November 18, 1918. Serial No. 262,964.

*To all whom it may concern:*

Be it known that I, ARTHUR R. CURTIS, a citizen of the United States, residing at Cleveland, in the county of Cuyahoga and State of Ohio, have invented a certain new and useful Improvement in Washer-Drive Mechanism, of which the following is a full, clear, and exact description.

This invention relates to a power transmitting or driving mechanism designed to cause a member to be rotated alternately and successively, first in one direction and then another from power derived from a motor or other member which rotates continuously in one direction. More particularly, the invention relates to a drive mechanism between the motor and the cylinder of a washing motor designed to be rotated a predetermined number of revolutions in one direction and then reversed and rotated the same number of revolutions in the reverse direction, and the invention has particular utility in a combined washer and extractor, the general arrangement and construction of which constitutes the subject matter of another application filed by me of even date herewith.

The principal object of the invention is to provide a power transmitting or driving mechanism by which movement is transmitted from the motor or source to the ultimate member to be driven with minimum loss of power, and which reverses the direction of rotation of the driven member silently and without shock. Further, the invention aims to provide a mechanism of this character which not only works smoothly, economically and silently, but is durable and free of serious mechanical complications which are liable to get out of order.

The invention may be briefly summarized as consisting in certain novel details of construction and combinations and arrangements of parts which will be described in the specification and set forth in the appended claims.

In the accompanying sheets of drawings wherein I have shown the preferred embodiment of my invention, Fig. 1 is a vertical sectional view of the driving mechanism showing in side elevation the driving motor and a portion of the ultimate driven member, in this instance, the cylinder of a washer; Fig. 2 is a side or face view of the same looking toward the left of Fig. 1, with portions broken away and removed; Fig. 3 is a detached view of the split or divided clutch rings and their supporting means; Fig. 4 is a sectional view through the same; Fig. 5 is a fragmentary view looking at the split or divided parts of the clutch rings and of the arms which connect the same to the shaft to be rotated; Fig. 6 is a fragmentary sectional view substantially along the line 6—6 of Fig. 2; and Fig. 7 is a detail plan view of the major portion of the reversing mechanism.

Referring now to the drawings, 10 represents the source of power, in this case, an electric motor, which through the driving mechanism to be explained, rotates the washer cylinder 11 through a predetermined number of revolutions first in one direction and then the other. This cylinder is connected by a detachable coupling designated as a whole by the reference character 12, to a shaft 13 which is hollow for a portion of its length, for a purpose to be explained, and is mounted co-axially with the cylinder and partakes of the same movements as the latter.

The driving mechanism is enclosed and partly supported by a casing 14, secured to a suitable support 15, which in this instance is the one end of the washer tub enclosing the cylinder 11.

Referring now to the details of the driving mechanism, it will be observed that the motor shaft carries a pinion 16 which engages and rotates continuously in the same direction as long as the motor is in operation, a gear 17, mounted on a shaft 18, supported by the casing and carrying a wide-faced pinion 19 which rotates what may be termed a clutch gear 20. Likewise this pinion 19 drives a second pinion 21 of the same size, and this pinion meshes with and drives a second clutch gear 22. These gears 20 and 22 which are of the same size, are continuously rotated in opposite directions about the axis of the shaft 13, to which they are alternately clutched by friction clutches.

The clutching of one of these gears to the shaft 13, and simultaneous releasing of the other gear therefrom is accomplished through the medium of two split clutch rings 23 and 24, the details of which are shown in Figs. 3, 4 and 5. These rings are formed integral with, or at least rigidly attached to the shaft 13, the connecting and supporting means consisting in this case of a U-shaped device 25, with arms projecting outwardly from the shaft 13, and each connected to one end of one of the rings, the other end of the latter being free to be moved toward and from the end attached to the device 25. These clutch rings normally lie just inside of the gears 20 and 22, but unless they are expanded, they do not transmit power from either gear to the shaft. By reference to Fig. 5 it will be seen that the free ends of the split rings point in opposite directions.

For the purpose of expanding and contracting these clutch rings I make use of two expanders in the form of wedges 26, disposed radially with wedge-shaped outer ends adapted to be forced out between the ends of the two split rings. At their inner ends these expanders 26 have ball and socket connections with a so-called rocker 27, which at its middle point engages a knife edge 18, and is pressed yieldingly outward against the same by a pair of springs 29 (see Fig. 2) which are connected to the lower part of the rocker and at their outer ends are connected to the device 25 which connects the rings to the shaft 13. This knife edge is formed on a member 30 adjustably attached to the device 25 so that it may be moved inward and outward by an adjusting screw 31 passing through the outer portion of the latter, as shown in Fig. 1. It will be understood that the clutch rings, the part 30 having the knife edge, the rocker 27, and the springs which hold it against the knife edge are all connected with the shaft 13 so as to rotate with the latter, and that these parts are all stationary when the shaft and cylinder 11 are stationary, though the outer surrounding clutch gears 20 and 22 may freely rotate about the same if the motor is allowed to run after the cylinder is stationary. It will be understood also, from the construction so far described, considered in connection with the drawings, particularly Fig. 1, that when the rocker is in its middle or neutral position, neither clutch gear is clutched to the shaft, in which event the cylinder is stationary, and that if the rocker is moved beyond the center position in one direction or the other, the springs 29 will rock the rocker so as to move one wedge inward away from clutching position, and at the same time shift the other wedge outward to clutching position, and that the particular clutch ring which is expanded, and hence the direction in which the shaft 13 and cylinder are rotated, will depend upon the direction in which the rocker 27 is rocked beyond its exact center position which is shown in Fig. 1.

To cause alternate and successive clutching and unclutching of the two clutch gears to the shaft, devices are provided to rock the rocker back and forth at predetermined intervals past its center position so that the springs can manipulate the wedges in the manner stated, and this is done in the following manner and with the following described reversing mechanism. Below the shaft 13 there is supported by the casing, a transverse shaft 32 carrying a pinion 33, the shaft being mounted in brackets 34 and 35 secured to a substantially central outwardly flanged part 14ᵃ of the casing. This pinion is caused to be rotated slowly relative to the rotation of the clutch gears 20 and 22, and this is accomplished in this case by having the pinion engage a spiral tooth or spiral curved ridge 36 on the side of gear 20 (see Figs. 1 and 2), the arrangement being such that on each rotation of the clutch gear 20, the pinion 33 will be advanced one tooth.

On opposite sides of the pinion 33, and formed as a part thereof, are two cams, one shown by full lines in Fig. 1, and designated 33ᵃ, and the other shown by dotted lines in the same figure, and designated 33ᵇ. These cams are engaged by the inturned fingers of two rocking levers 37 (Fig. 1) and 38 (Fig. 2), which levers in this instance are secured at approximately right angles to each other, and on opposite sides of the pinion 33, to a rock shaft 39, which is mounted in bearings in the lower part of the fixed brackets 34 and 35, previously referred to, the arrangement being such that with a given speed of rotation of the pinion 33, this rock shaft through the action of the cams on the levers 37 and 38, will be rocked at predetermined intervals, back and forth, first in one direction and then in the other.

Mounted on this rock shaft 39, so that it may either rock therewith, or slide axially thereon, is a lever 40, having at its upper end a flat portion or blade 40ᵃ, the side of which is normally held by a spring 41 which surrounds the rock shaft 39, into the notch or jaw of the V-shaped upper end 38ᵃ of the rocking cam lever 38, and the upper edge portion of which engages in a groove of a threaded pin 42 adjustably seated in one end of a tubular plunger 43 which is adapted to be moved endwise through the hollow portion of the cylinder driving shaft 13, and near its inner end having an opening in which a tail or inward extension of the rocker 27 extends.

It will be observed from this described construction, that when the lever 40 is held by the spring into engagement with the jaw of the rocking lever 38, it will be rocked back and forth at predetermined instants through the action of the cams 33ᵃ and 33ᵇ on the inturned fingers of the rocking levers 37 and 38, and as it is rocked back and forth it will move the inner plunger 43 axially, and thus shift the rocker first in one direction and then in the other direction past its mid position, so that the springs 29 may further shift the rocker to cause the inward and outward shifting of the two wedges respectively, and the consequent clutching and unclutching of the clutch gears.

The fixed bracket 34 has at its upper end a V-shaped notch or jaw 34ª which is similar to the jaw 38ª at the top of the rocking lever 38, and which is in such position that it may receive the blade 40ª at the top of the lever 40 when the latter is shifted axially on the rock shaft 39 out of engagement with the jaws 38ª, and furthermore, the jaw 34ª of the bracket 34 is so positioned that when the blade of the lever 40 is shifted into it, the rocker 27 will be held in its neutral or mid position, in which event the cylinder will be stopped without stopping the motor.

To stop the rotation of the shaft 13 and cylinder in the manner above stated, and to start the same, I provide a controller handle 44 (Fig. 1) secured to a short stud 45, mounted in a cap 46 of the extension 14ª of the casing 14, the inner end of this stud having a tongue 47, which extends downward when the cylinder is in operation, as shown in Figs. 1 and 2, and when in this position it lies alongside of a downward extension 40ᵇ of the lever 40. The arrangement is such that when the handle is turned ninety degrees from the vertical position shown in Fig. 1, the tongue 47 will shift the lever 40 out of the jaw 38ª of rocking lever 38, and into the stationary jaw 34ª of bracket 34, and will hold the rocker in its mid position with both clutch rings disengaged, and with the cylinder stationary. When the lever 40 is held in this position it will not interfere with the movement of the other driven parts, including the intermittent back and forth rocking movement of the rocking levers 37 and 38, but as soon as the handle is turned to running position, the spring 41 again shifts the lever 40 laterally into the jaw of rocking lever 38, and this at once starts the cylinder in operation.

It should be noted that the range of movement of the rocking jaw 38 which rocks the lever 40, and the position of the fixed jaw of the bracket 34 are such that the cylinder will always be instantly stopped by swinging the handle 44 upward, and will always instantly start when the handle is swung downward, and this starting or stopping is effected in the manner stated, irrespective of the point in a cycle of operations that the lever is shifted to stopping or starting position as the case may be.

The operation of the mechanism as a whole will be understood from the above description without a repeated statement of the operation, though attention is directed to the fact that when the rocker is shifted beyond its mid position in either direction so that the line of action of the springs is to one side or the other of the dead center, one or the other of the gears is effectively clutched to the shaft with all clutching forces self-contained in the clutch structure, and without setting up any thrust or pressures of any other kind on the bearings.

Furthermore, this clutching and unclutching action takes place quietly and smoothly, without any noticeable shock. This desirable feature is attained, at least in part, by the fact that the cams 33ª and 33ᵇ on opposite sides of the cam pinion 33, not only shift the rocker from one side to the other of its center position, but they control the rate at which the springs cause the wedges to expand the clutch rings into engagement with the associated clutch gears, for when either cam shifts its associated cam lever 37 or 38 away from the center or axis of rotation of the cam, so as to rock the shaft in one direction, the other cam lever is brought in against its associated cam, which is so designed as to allow the springs to act quickly enough to produce rapid reversal of the cylinder, but nevertheless with a sufficiently gradual action to practically eliminate shock.

Various changes may be made in details of construction and arrangements of parts without deviating from the principles of my invention, and though I have shown only the preferred embodiment, I aim in my claims to cover all modifications and changes which do not involve a departure from the spirit and scope of my invention in its broadest aspects.

Having described my invention, I claim:

1. The combination with a shaft to be rotated, of a pair of driving members adapted to be rotated in opposite directions and to be successfully clutched to said shaft so as to reverse the direction of rotation of said shaft at intervals, a clutch device having a pair of expansible clutch members within said driving members and adapted to be expanded into engagement therewith, and means comprising a rocking member carried by said device for causing one clutch member to be expanded and the other to be substantially simultaneously contracted.

2. In combination with a member to be driven, two driving members mounted concentrically with respect thereto and adapted to be rotated in opposite directions, a pair of expansible clutch rings for causing said driving members to be alternately clutched to and unclutched from the driven member, wedges for expanding said rings, and a rocking member rotatable with the clutch rings for operating said wedges.

3. In combination with a member to be driven, two driving members mounted concentrically with respect thereto and adapted to be rotated in opposite directions, a pair of expansible clutch rings for causing said driving members to be alterately clutched to and unclutched from the driven member, wedges for expanding said rings, and means comprising a rocking member for operating said wedges, said rocking member being connected to said wedges on opposite sides of its axis of movement, whereby when rocked in one direction it will withdraw one wedge and insert the other.

4. In combination with a shaft having two driving members adapted to be rotated in opposite directions, means for separately and alternately clutching said members to the shaft, comprising a pair of clutch rings, each cooperating with one of said driving members, means for expanding said clutch rings comprising expanding members, a pivoted rocker mounted between the clutch rings for moving said members, spring means connected to said rocker to actuate the same when the rocker is moved past its center position, and means for automatically causing the rocker to be moved first to one side and then the other side of its center position.

5. In combination with a shaft and two driving members mounted thereon and adapted to be driven in opposite directions, means for separately clutching said members to the shaft comprising two clutch rings, each co-operating with one of said driving members, expanders adapted to be moved in and out between the ends of the rings, means for controlling said expanders comprising a rocker connected to said expanders, and a supporting abutment for the rocker having substantially a knife edge about which the rocker may be turned.

6. In combination with a shaft and two driving members mounted thereon and adapted to be driven in opposite directions, means for separately clutching said members to the shaft comprising two clutch rings, each co-operating with one of said driving members, expanders adapted to be moved in and out between the ends of the rings means for controlling said expanders comprising a rocker connected to said expanders, a supporting abutment on which the rocker is pivoted, and means whereby the position of said abutment may be adjusted.

7. In combination with a shaft to be driven, a pair of driving members mounted thereon and adapted to be rotated in opposite directions, means for separately and alternately clutching said driving members to the shaft, said means comprising a clutch member connected to the shaft and having two expansible rings each co-operating with one of said driving members, a pair of expanders, each adapted to expand one of said rings, a rocker connected to said expanders to actuate the same, a support on which said rocker is pivoted, and yieldable means connected to the rocker and serving to turn the rocker in either direction when moved beyond its center position.

8. In combination with a shaft to be rotated and driving members thereon adapted to be rotated in opposite directions, of means for separately and alternately clutching said members to the shaft, said means comprising a clutch member between the driving members and provided with two expansible rings, each co-operating with one of the said driving members, expanders each adapted to expand one of said rings, a rocker connected to said expanders, an abutment carried by said clutch member on which said rocker is pivoted, springs connected to said rocker to throw the same in one direction or the other beyond its mid position to operate the expanders, and means for automatically shifting said rocker past its mid position, first in one direction and then in the other.

9. In combination with a shaft to be rotated, two driving members adapted to be rotated in opposite directions, clutching means by which said members are alternately and successively clutched to the shaft, and a reversing mechanism comprising a clutch operating rocker, a rocker actuating member movable in an endwise direction in said shaft to be rotated, and connected to the rocker, an oscillatory shaft connected to the rocker actuating member to actuate the same, and means for actuating said oscillatory shaft.

10. In combination with a shaft to be rotated, two driving members adapted to be rotated in opposite directions, clutching means including a pair of expansible members for separately clutching the driving members to the shaft, a pair of expanders for actuating said expansible members, a rocker for actuating the expanders, an oscillatory shaft, means for rocking the same first in one direction and then the other, and means operated by the oscillatory shaft for actuating the rocker.

11. In combination with a shaft to be rotated and two driving members adapted to be rotated in opposite directions, clutching means by which said members are alternately and successively clutched to the shaft, and a reversing mechanism to cause the operation of the clutches, said reversing mechanism comprising an oscillatory member connected to the clutching means, means for oscillating said member, and manually operable means for breaking the working connection between the said oscillating means and the clutching means.

12. In combination with a shaft and a pair of driving members mounted thereon and adapted to be rotated in opposite directions, clutches for alternately and successively clutching said members to the shaft, a reversing mechanism controlling the operation of said clutches, said reversing mechanism comprising an oscillatory member connected to the clutches, means for oscillating said member, and manually operable means for holding said oscillatory member stationary and out of operative relation with the oscillating means.

13. In combination with a shaft to be rotated and two driving members mounted thereon and adapted to be rotated in opposite directions, clutches for alternately and successively clutching said members to the shaft, clutch operating devices, reversing mechanism for operating said devices to reverse the direction of rotation of the shaft, said reversing mechanism comprising a movable member connected to said clutch operating devices, means for shifting said member successfully to positions to cause the successive operation of the clutches, and manually operable means for at will stopping and starting the movement of said member, said means operating to stop or start the rotation of the shaft at any point in the cycle of movement of said movable member.

14. In combination with a shaft to be rotated, two driving members mounted thereon and adapted to be rotated in opposite directions, clutching means for causing alternate and successive clutching of said members to the shaft, a reversing mechanism controlling the operation of the clutching means, said reversing mechanism comprising a rotary shaft, means for continuously rotating the same, an oscillatory shaft adjacent thereto, means by which said rotary shaft causes said oscillatory shaft to be rocked first in one direction and then the other, and means comprising a rocker operated by said oscillatory shaft and connected to said clutching means to cause first one driving member and then the other to be clutched to the shaft.

15. In combination with a shaft to be rotated, and driving members for rotating the same in opposite directions, clutching means for separately clutching said driving members to the shaft, automatic means for throwing the clutching means into driving relationship with respect to said members, including a positively actuated part and a spring which is permitted to act thereby to cause clutching engagement, and means for controlling the rate at which said automatic means operates.

16. In combination with a shaft to be rotated, driving members for rotating the same in opposite directions, clutches for separately clutching said driving members to the shaft and comprising expansible rings, each associated with one of said members, expanders adapted to be inserted between the ends of the rings to expand the same, yieldable means for actuating the expanders and causing clutching engagement, and reversing mechanism for causing said yieldable means to operate the expanders so as to cause one driving member and then the other to be clutched to the shaft, said reversing mechanism embodying means for controlling the rate at which the expanders are operated by the yielding means.

In testimony whereof I hereunto affix my signature.

ARTHUR R. CURTIS.